United States Patent [19]

Reid

[11] 4,174,674

[45] Nov. 20, 1979

[54] DEVICE FOR CITIZENS BAND RADIO USERS TO DETERMINE HIGHWAY LOCATION

[76] Inventor: Richard K. Reid, 7402 NW. 23rd, Apt. 106, Bethany, Okla. 73008

[21] Appl. No.: 908,677

[22] Filed: May 23, 1978

[51] Int. Cl.[2] .......................... G09B 19/02; G06C 3/00

[52] U.S. Cl. .......................................... 116/307; 35/74; 116/318; 116/DIG. 47; 235/88 R

[58] Field of Search ............... 116/133, DIG. 47, 307, 116/309, 318; 40/115, 495; 35/74; 235/88 R, 78 N, 88 A

[56] References Cited

U.S. PATENT DOCUMENTS

| | | | |
|---|---|---|---|
| 2,806,650 | 9/1957 | Mead | 235/88 |
| 2,907,123 | 10/1959 | McMahon | 35/74 X |
| 3,027,073 | 3/1962 | Handelman | 40/495 |
| 3,279,695 | 10/1966 | Krause | 235/78 N |
| 3,358,920 | 12/1967 | Ringley | 35/74 X |
| 3,423,847 | 1/1969 | Barbee | 35/74 X |
| 3,544,768 | 12/1970 | Warner | 35/74 |
| 3,627,200 | 12/1971 | Sadler | 116/133 X |

*Primary Examiner*—Daniel M. Yasich
*Attorney, Agent, or Firm*—W. Britton Moore

[57] ABSTRACT

A portable device to determine highway marker locations including an enlarged disc dial having graduated scale markings on each side thereof and therearound representing increasing and decreasing highway mileage markers, respectively, and smaller disc dials superposed on either side of and centrally rotatably and lockably mounted thereon. The latter are provided with scale markings therearound representing vehicle odometer readings. To keep track of a vehicle's highway location, the user visually notes the last highway marker passed and rotates the small dial until the last two digits of the vehicle odometer reading indicated on the dial scale are aligned with the scale marking on the appropriate large intermediate dial (either increasing or decreasing, depending on direction of travel) corresponding with that mile marker, and the three discs are locked thereat. Thereafter, and for the remainder of that trip, the present nearest mile marker location of the vehicle may be determined by viewing the odometer reading and then looking at the device and reading directly from the scale on the appropriate large dial, the mile marker that aligns with the last two digits of the odometer reading.

5 Claims, 4 Drawing Figures

DEVICE FOR CITIZENS BAND RADIO USERS TO DETERMINE HIGHWAY LOCATION

The present invention relates to an indicator for citizen's band radio users to determine highway mileage location when an occurrence thereat is to be broadcast to other highway travelers with C/B's.

While traveling on interstate highways and the like, it is difficult to keep track of and to readily determine the highway mileage markers. This is particularly bothersome to users of citizens's band radios in communicating with other C/B'ers, where highway location is important, because a broadcasting C/B'er is usually asked his "1020", or present location, and generally responds that he is unaware and must first visually check a highway marker. In view of the time delay involved and difficulty in viewing markers at night or in inclement weather, this becomes most objectionable.

The principal object of the present invention is to provide a hand operated, pocket size indicator for citizen band (C/B) radio users to keep track of and to determine highway mileage marker locations and enable broadcast thereof to other C/B'ers traveling that highway.

Another object is to provide an indicator including a large dial sandwiched between and rotatably and lockably interconnected to two smaller dials, wherein one face of the large dial has graduated scale markings thereon and therearound representing increasing highway mileage markers and the other face has corresponding scale markings representing decreasing mileage markers, and the smaller dials have graduated scale markings thereon and therearound representing vehicle odometer readings.

Still another object is the provision of an inexpensive, light weight and easily operated indicator for highway travelers, in general, to use to keep track of their mileage location.

A further object is the provision of a three dial indicator wherein the dials are centrally mounted by a lock screw to first enable rotation of the outermost dials relative to the center dial and then to lock the dials in position when determining a highway mileage location.

These and other objects and advantages will be apparent as the specification is considered with the accompanying drawings wherein FIG. 1 is a top plan view of the indicator with the large dial having scale markings thereon indicating increasing highway mile markers;

Figure 1:
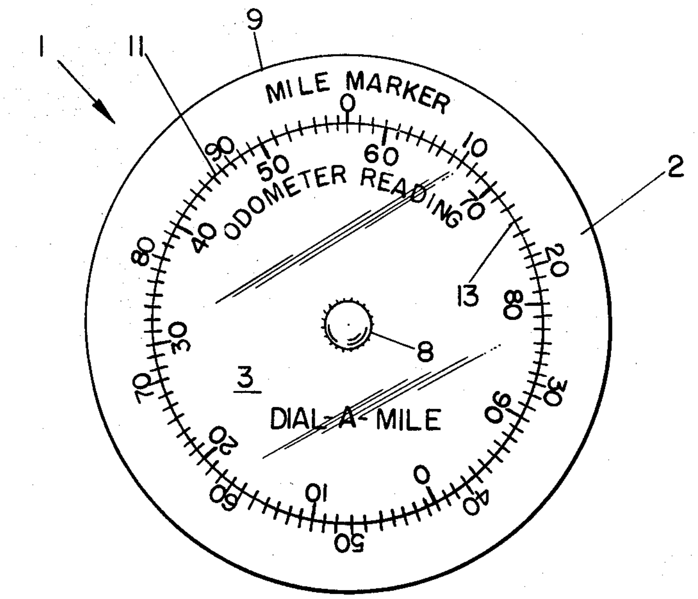

Referring more particularly to the drawings, wherein similar reference characters designate like parts throughout the several views, numeral 1 generally identifies an indicator including three superposed, relatively thin, flat, circular discs or dials of some suitable material, such as, plastic or coated cardboard and the like, with the centermost disc 2 being of larger diameter so as to project beyond the annuli of smaller dials 3 and 4 on either side thereof.

Figure 4:
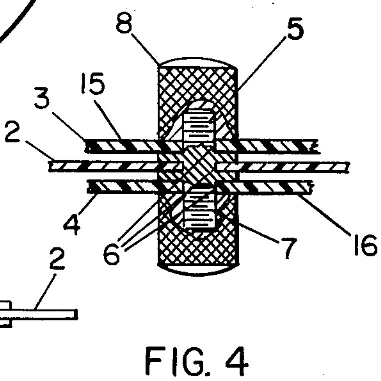
FIG. 4 is an enlarged section on the line 4—4 of FIG. 2.

A center mounting post or screw 5 projects through center openings 6 in the three discs and enables relative rotation therebetween in an obvious manner, and spaced flanged portions are formed on the screw, as shown in FIG. 4, to retain the discs in separated but closely spaced relationship. The opposing ends of screw 5 are threaded, as at 7, to threadedly receive knurled nuts 8 thereon, as best shown in FIG. 4, which, when tightened, applies squeezing pressure to and clamps and locks the discs together, and, when loosened, permits of relative rotation thereof.

Opposite faces 9 and 10 of the enlarged centermost disc 2 are each formed with an annular band of scale markings 11 and 12, respectively, extending 360° (degrees) therearound in increments of one (1) from zero to one hundred (0 'to 100) representing highway mileage markers which customarily indicate mileage for each 100 miles. These scales will be arranged on the two faces 9 and 10 adjacent to the peripheries of the two smaller discs 3 and 4 and will be viewable relative thereto. As highway mileage direction markers on one side of a highway customarily increase numerically and those on the other side decrease to accommodate motorists traveling in opposite directions, it is necessary for the numerals on mileage scale 11 thereon to increase in a clockwise direction, viewing FIG. 1, whereas, the numerals on mileage scale 12 on the other face 10 will decrease in a clockwise direction, viewing FIG. 2.

All East/West Interstate Highways have mile markers with increasing numbers from West to East. Mile markers on North/South Highways increase from South to North, with the mile markers continuing to increase from West to East and from South to North until a State line is crossed. The markers then start over at zero (0) at the Western State line on East/West Highways and at the Southern State line on North/South Highways. If an Interstate highway starts in the middle of a State, the zero (0) mile marker will begin at the West or South end. As mile markers are the same on both sides of a highway, identification thereof is readily determinable.

An annular band of scale markings 13 and 14 is formed on and extends 360° (degrees) around the annulus of each of the outermost faces 15 and 16 of smaller discs 3 and 4, respectively, in increments of one (1) from zero to one hundred (0 to 100) representing vehicle odometer readings. As scale markings 13 and 14 are slightly inwardly offset from scale markings 11 and 12 on disc 2, it will be apparent that when the nuts 8 are loose on center screw 5, either disc 3 or 4 may be rotated relative to the center disc 2 and the selected face 9 or 10 thereon, as hereinafter to be described.

Motorists equipped with citizens band radios are accustomed to listen and inter-broadcast. When announcing an occurrence or situation on a particular section of a highway which will be of interest to other C/Bers traveling that highway, if that location is specifically pin pointed or identified, approaching or following motorists will be alerted thereto, and this can most effectively be done by the broadcasting C/Ber referring to the last mileage marker passed. Thus, when so equipped, a C/B'er may set his indicator by first noting the last highway mileage marker passed. Then, depending upon whether the markers on the side of the highway increase or decrease numerically, rotate either disc 3 with reference to face 9 of center disc 2 and scale 11 thereon, where the markers increase, or disc 4 with reference to face 10 of disc 2 and scale 12 thereon, where the markers decrease, until the last two digits of the broadcaster's vehicle odometer reading transposed to either the scale markings 13 and 14 of discs 3 and 4 are aligned with the scale marking corresponding to that mile marker on either face 9 or 10 of disc 2. The discs 2–4 will then be locked in that set position by tightening the center screw nuts 8, as previously described. Thereafter, whenever it becomes necessary to broadcast the position of the vehicle or a highway occurrence, the broadcaster need only view the vehicle odometer and note the last two digits thereon and then view the appropriate side of the device (depending on the direction of travel the operator will be using either the increasing or decreasing side) and then read the mile marker directly from scale 11 or 12 that aligns with the last two digits of the odometer reading shown on scale 13 or 14.

Bearing in mind that mileage markers in a State may exceed 100, such as 100–200, or 200–300, etc., only the last two digits on the odometer reading are used, which is also the case with the mile markers. It is, of course, relatively simple to remember if you are between mile markers 0–100, 100–200, or 200–300, etc.

For example, and with reference to FIG. 1, wherein the dial face 9 on disc 2 represents increasing mile markers, when the indicator was initially set, mile marker 33 had just been passed with the vehicle odometer reading being 45290, so the discs are locked thereat. When it is desired to broadcast a particular highway location, the vehicle odometer reading may be at 45341, so simply read directly from scale 11 on dial face 9 the mile marker that aligns with the last two digits of the odometer reading, in this case, your present location is mile marker 84.

Still referring to FIG. 1, a further example would be when the vehicle odometer reading is at 45362, your location would be mile marker 105. And further, when the odometer reading is 45496, the mile marker is read directly from scale 11 as being 239.

Figure 2:
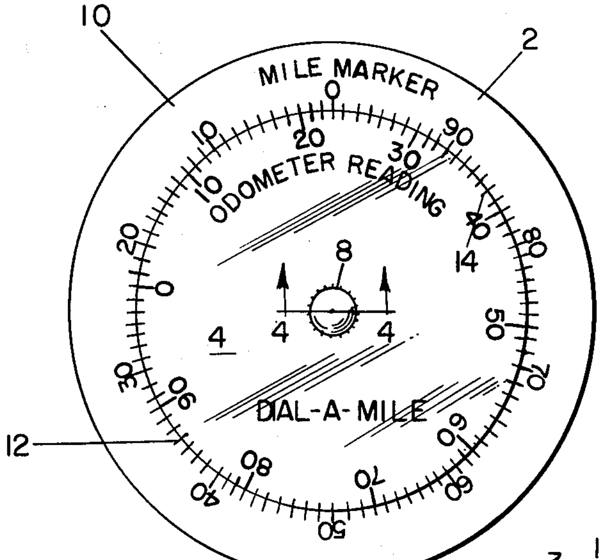
FIG. 2 is a top plan view of the indicator with the large dial having scale markings thereon indicating decreasing highway mile markers.
Figure 3:
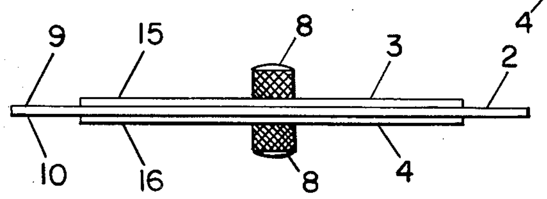
FIG. 3 is a side elevation of the indicator.

On the otherhand, where the highway mile markers decrease numerically, as represented in FIG. 2, dial face 10 on the flip side of disc 2 is uppermost and viewable. Thus, and for example, where mile marker 189 has just been passed and the vehicle odometer reading is 47834, and the discs are locked thereat, a subsequent highway location may be broadcast, for example, when the vehicle odometer reading is 47888, simply read directly from scale 12 on dial face 10 the mile marker that aligns with the last two digits of the odometer reading, in this case, your present location is mile marker 135.

Again referring to FIG. 2, a further example would be when the vehicle odometer reading is at 47962 your location would be mile marker 61.

In view of the international adoption of the metric system, it will be apparent that the present invention may have the scale markings on both faces of center disc 2 representing kilometers to correspond with highway kilometer markers, but such will not change the functioning and operation hereof.

While a preferred embodiment of this indicator has been shown and described, it is to be understood that it is not to be limited to use by C/B operators, and that various changes and improvements may be made therein without departing from the scope and spirit of the appended claims.

What I claim:

1. In a portable hand held mileage indicator for citizen's band radio users and the like, in vehicles having odometers, a large circular flat disc, a smaller circular flat disc superposed on either side of said large disc, said discs being centrally pivotally mounted on screw means having spaced flanged portions for relative rotation, nut means rotationally mounted on opposing ends of said screw means for locking said discs in fixed set positions, graduated scale markings on each face of said large disc and extending circumferentially therearound representing increasing and decreasing highway mileage markers, respectively, scale markings on the outermost faces of said smaller discs and extending circumferentially therearound representing vehicle odometer readings whereby highway location may be noted and broadcast to other citizen's band radio users in that vicinity by noting the last highway mileage marker passed and rotating the appropriate small disc until the last two digits of the vehicle odometer reading on that small disc scale are aligned with the scale marking on said large disc scale and locking said discs in that fixed set position so that a subsequent mileage marker location may be determined by viewing the odometer reading and determining the users highway location by reading directly from the indicator the mile marker that aligns with the last two digits of the odometer reading.

2. In a device according to claim 1, wherein the scale markings on one face of said large disc represent increasing highway mileage markers, and the scale markings on the other face thereof represent decreasing highway mileage markers.

3. In a device according to claim 1, wherein said small discs are of the same diameter and their annuli are inset from the annulus of said large disc.

4. In a device according to claim 3, wherein the scale markings on each face of said large disc are adjacent the peripheries of said smaller discs, and the scale markings on said smaller discs are adjacent to their peripheries so that said scale markings may be aligned.

5. In a device according to claim 4, wherein each of said scales are graduated in increments of one (1) from zero to one hundred (0 to 100).

* * * * *